United States Patent
Nichols et al.

(10) Patent No.: US 9,344,209 B2
(45) Date of Patent: May 17, 2016

(54) DISCRETE TIME COMPENSATION MECHANISMS

(71) Applicant: APPLIED MICRO CIRCUITS CORPORATION, Sunnyvale, CA (US)

(72) Inventors: Stacy Nichols, Kanata (CA); Sameer Gandhi, Karnataka (IN); Burt Christian, Ottawa (CA)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 116 days.

(21) Appl. No.: 14/016,534

(22) Filed: Sep. 3, 2013

(65) Prior Publication Data

US 2015/0067381 A1    Mar. 5, 2015

(51) Int. Cl.
*H04J 3/06* (2006.01)

(52) U.S. Cl.
CPC ............. *H04J 3/0697* (2013.01); *H04J 3/0661* (2013.01)

(58) Field of Classification Search
CPC ...................................... H04J 3/0638
USPC ............................................. 370/503
See application file for complete search history.

(56) References Cited

U.S. PATENT DOCUMENTS

| | | | |
|---|---|---|---|
| 5,890,207 A | 3/1999 | Sne et al. | |
| 5,890,219 A | 3/1999 | Scaringella et al. | |
| 6,704,890 B1 * | 3/2004 | Carotti | H04L 25/14 714/700 |
| 7,283,551 B1 | 10/2007 | Algie | |
| 7,602,166 B1 | 10/2009 | Kang | |
| 7,656,985 B1 | 2/2010 | Aweya et al. | |
| 7,860,205 B1 | 12/2010 | Aweya et al. | |
| 8,275,087 B2 | 9/2012 | Hadzic et al. | |
| 8,369,973 B2 | 2/2013 | Risbo | |
| 2003/0223409 A1 * | 12/2003 | Wiebe | 370/352 |
| 2006/0062363 A1 * | 3/2006 | Albrett | 379/101.01 |
| 2013/0343409 A1 * | 12/2013 | Haulin | 370/503 |

* cited by examiner

*Primary Examiner* — Samina Choudhry
(74) *Attorney, Agent, or Firm* — Amin, Turocy & Watson LLP; Gregory Turocy

(57) ABSTRACT

Discrete time compensation mechanisms include a channel component configured for determining which channel of a plurality of channels to process time slots of sampled data that are time stamped in a discrete time and processing the time slots of the sampled data to the plurality of channels. A common channel clock component is configured for time stamping the time slots of the sampled data in the discrete time domain that is faster than a non-discrete reference time stamp of continuous data from which the time slots are sampled from and for processing the sampled data through the plurality of channels faster than the continuous data is being received. Compensations for one or more gaps are generated based on a set of predetermined criteria and a corrected time stamp is applied to the sampled data for processing among different processing channels.

16 Claims, 10 Drawing Sheets

400
DISCRETE TIME COMPENSATION MECHANISMS

TECHNICAL FIELD

The subject application relates to compensation mechanisms and, in particular, discrete time compensation mechanisms.

BACKGROUND

A timestamp represents a current time of an event that can be recorded by a computer device or a processing component. Through a time stamping protocol (e.g., a Network Time Protocol, etc.), a computer system can operate to maintain an accurate current time. The timestamps can be calibrated to fractions of a second, in which such precision enables networked applications and computers to communicate effectively. The timestamp mechanism is functional for a wide variety of synchronization purposes, such as assigning a sequence order for a multi-event transaction so that if a failure occurs the transaction can be avoided, ensuring that wireless networks coordinate phone calls or communications, logging of events, network management, and the like.

A timestamp can also be used to record time in relation to a particular starting point. In Internet Protocol (IP) telephony, for example, the Real-time Transport Protocol (RTP) assigns sequential timestamps to voice packets so that they can be buffered by the receiver, reassembled, and delivered without error. When writing a program, the programmer is usually provided an application program interface for a timestamp that the operating system can provide during program execution. Whether reassembling delivered data or ensuring the sequential order of processing data for processing, errors are compensated for in order for the flow of data to not be interrupted. In particular when using time slicing technology, the effects of having asynchronous clock speeds when processing data through complex processing systems and multiple processing pipelines are mitigated by compensation mechanisms to ensure the correct time stamping and the uninterrupted processing flow of data.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Various embodiments are disclosed for a time slicing system with discrete time compensation mechanisms. An exemplary system comprises a channel component configured for determining which channel of a plurality of channels to process time slots of sampled data that are time stamped in a discrete time domain and processing the time slots of the sampled data to the plurality of channels. A common channel clock component is configured for time stamping the time slots of the sampled data in the discrete time domain that is faster than a non-discrete time domain for a reference time stamp of continuous data from which the time slots are sampled, and for processing the sampled data through the plurality of channels faster than the continuous data is being received. A compensation component of the system is configured for compensating for a gap of data from among a plurality of gaps of data based on a set of predetermined criteria and applying a corrected time stamp to the sampled data for processing.

In another non-limiting embodiment, a method is disclosed that comprises receiving, by a system comprising a processor, a continuous data stream in a non-discrete time based on a reference clock component. Data of the continuous data stream is sampled in time slices in a discrete time with a common channel clock component that is faster than the reference clock component. The method further comprises compensating for a gap of data among the time slices based on a set of predetermined criteria with a compensated time stamping. The time slices are communicated to different channels that process the data of the time slices in parallel with the compensated time stamping.

In yet another non-limiting embodiment, an exemplary system for discrete time compensation comprises a reference clock component configured for time stamping data of a continuous data stream in a non-discrete time. A sampling component is configured for sampling the continuous data stream in time slices based on a predetermined number of bits for a data word. A common channel clock component is configured for time stamping the time slices in a discrete time for a plurality of processing channels, in which the discrete time comprises a faster clock rate than the non-discrete time of the reference clock component. A channel component is configured for determining a processing channel of the plurality of processing channels to process the time slices of data based on a compensated time stamp. The channels of the plurality of channels are respectively configured for processing the time slices in parallel.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
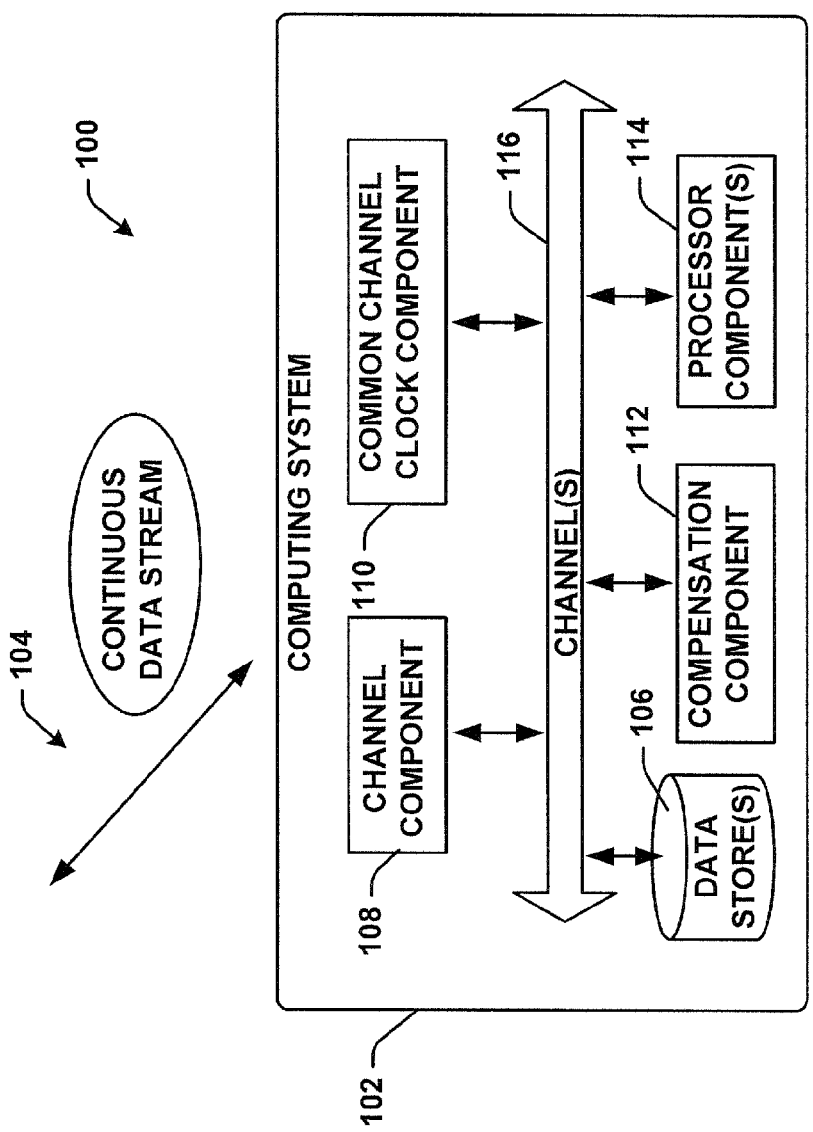
FIG. 1 illustrates an example discrete time compensating system in accordance with various aspects described herein.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Overview

In consideration of the above-described deficiencies among other things, various embodiments are provided for generating compensation mechanisms for discrete time processing channels that process sampled data at a higher speed clock domain in a time slice domain compared to a reference clock that enables time stamping in real time as the continuous data is received. A channel component is operatively coupled to a common channel clock, which operates to process (e.g., time slice) continuous data faster than the reference clock. Thus, the time stamping operations of the common channel clock is asynchronous with respect to the reference clock operating in real time.

Rather than communicating the non-discrete, continuous data received in a continuous data stream of bits, the received data can be sampled and communicated in large words or chunks of data according to time slices to further processing channels or pipelines. The sampled data can be communicated in parallel along a plurality of channels to be processed further by one or more processors associated with each channel. To communicate the sampled data, the channel component can operate with a single processor, for example, as a scheduler/arbitrator to facilitate an arbitration of the time slices of sampled data to processing pipelines (channels) that process the sampled data further.

Additionally, the common channel clock can operate to time stamp the data for the processors associated with the channels independently based on different protocols and processing parameters of the respective channels. The channel clock comprises a single clock that operates at a faster rate than the reference clock for clocking time slices or slots of discrete data in a time slice domain. The common channel clock can be configured for time stamping the time slots of the sampled data in the discrete time domain at a faster rate than a non-discrete reference time stamp of continuous data that is time stamped as incoming real time data from which the time slots are sampled from. As such, the channel clock is operatively connected to the common channel clock to process the sampled data through the plurality of channels faster than the continuous non-discrete data is being received.

Application of a real time timestamp can result in a large variable error due to the loose coupling between time sliced data processing paths and real time. Accurate time stamps in the time sliced domain are generated within this disclosure by a compensation system to compensate for any such error. Mechanisms to compensate for the time domain differences between the incoming real time data clock and the common channel clock are incorporated in components further discussed in this disclosure that are operatively coupled to the common channel clock component and the channel component. The channel component can comprise a single processing pipeline comprising a single processor dedicated as a scheduler or arbitrator to the different pipelines that are designated for processing in different protocols respectively. A single common channel clock facilitates processing the sampled data in the time sliced domain in large words in parallel, concurrently, at the same time, and/or, in other words, substantially overlapping in time among the channels. For example, instead of having twelve different clock structures for twelve separate processing channels or pipelines for different chunks of data, one faster clock (the common channel clock) is enabled to operate for processing data among various channels having different protocols (e.g., via an Optical Transport Network, a Physical Coding Sublayer, for communicating different network protocols, such as Precision Time Protocol, Media Access Control data communication protocol, Generic Frame Procedure, and/or the like protocols for communication, and/or any combination thereof), and thus, different processing rates. The benefits include saving processor die space, reducing the number of logic gates, enhancing die shrink and efficiently narrowing the resources in the processor for processing large chunks or words of continuous data for sampling among multiple protocols.

In one example, a compensation component compensates for one or more gaps of data that result from the time and rate differences that results between the reference clock component and the common channel clock based on predetermined criteria. The compensation component comprises a plurality of per channel time of day counters that correspond to the plurality of channels and is configured for incrementing based on an increment value, which is independent (different) per channel among the plurality of channels respectively. A master time of day counter is configured for synchronizing the plurality of per channel time of data counters, and is synchronized to a reference clock component configured for time stamping the continuous data stream in the non-discrete time as it is received. The compensation component further comprises a plurality of per channel comparator components configured for determining a differential between per channel time of day counters and the master time of day counter. The differential is then utilized in enabling very accurate timestamps to be created in by the system, which can be applied to Precision Time Protocol (PTP) packets, Media Access Control protocol, and/or any sub layer protocol utilized in time stamping for data transmission, for example. Further mechanisms and details for compensating in discrete time for time slicing technologies are provided with reference to the figures below.

Examples of Discrete Time Compensation Mechanisms

Referring initially to FIG. 1, illustrated is a system 100 for generating discrete time compensation mechanisms for incoming continuous data and discrete data being processed among various processing pipelines in a time sliced domain. The systems disclosed within this disclosure, including system 100 can further include a memory that can store computer executable components and a processor that executes computer executable components, which can be or not be stored in the memory, examples of which can be found with reference to FIG. 10. For example, it is to be appreciated that the computer device 1012 can be used in connection with implementing one or more of the systems or components shown and described in connection with FIG. 1 as well as other figures disclosed herein. System 100 is one example architecture of a computing system in which the components of the system can be combined and/or operate externally to one another in different architectures. For example, the system 100 comprises a computing system 102 that receives a non-discrete continuous data stream 104 and processes the continuous stream of data via one or more data stores 106, a channel component 108, a common channel clock component 110, a compensation component 112, one or more processors 114 and a plurality of communication channels 116.

The channel component 108 operates to sample data from a continuous data stream 104 and communicate the sampled data to one or more channels 116 for further processing. For example, the channel component 108 can operate as a slicer/arbitrator that samples the data for processing further in discrete time slices (slots) and communicates the discrete data in various time speeds depending upon a channel 116 that is available for, requesting, or designated to receive one or more time slots. The continuous data stream 104 can be received and stored in one or more data stores (s) 106 that can comprise one or more data structures, memories, queues, caches, and/or the like, in which the channel component 108 can sample the data from. For example, the data store 106 can comprises a First In First Out (FIFO) queue or other type of operating scheduling algorithm for various processing tasks (e.g., sampled chunks of data) to receive processing time. The continuous data stream 104 can be sampled at a deterministic or predetermined interval by the channel component 108 reading a FIFO or other storage that stores or receives the data stream. In response to the data satisfying a predetermined quantity or a full word (e.g., 512 bits) in the time sliced domain or with respect to the time of the common clock component 110, a word of data is read from the FIFO or data store 106. However, the time slice domain (the time in which the continuous data stream is sampled in slices or time slots) of the common channel clock component 110 operates at a faster rate than an incoming reference clock (not shown) of the continuous data stream, or in other words, at a time/rate that the incoming data is being received. As a result, sampling intervals or gaps result in the time sliced data that are taken into account and compensated for processing via the compensation component 112.

The compensation component 112 operates to enable an accurate time stamp to be created in the system 100, which can be applied to packets for processing in different protocols, such as with PTP packets, MAC sub layer packets, etc. As a result of differences in the time sliced domain and in real time, gaps occur within the data. The gaps can comprise sampling intervals, for example, where insufficient data is present within the data store 106 (e.g., a FIFO queue, or the like) to completely encompass or fill a data word of a predetermined number of bits, or of a predetermined length for a portion or subset of the continuous data stream). Thus, when a gap occurs in the time stamping operations of the system 100, an absence of data occurs as provided by the FIFO resulting in a gap in the data stream. In addition, the gaps in time can vary in amounts of data that are within the gap time, and that are present for processing. The gaps, as well as the variable nature of the gaps are analyzed by the compensation component 112 in order to determine a treatment for the errors in time, or for the discrepancies that create the gaps between the common channel clock component 110 and the time in which the continuous data stream 104 is received for processing. For example, the discrepancies can be caused from a differential clock rate between the primary reference (real time) clock and the common channel clock component 110, an interpolation of the time interval for incrementing a channel counter for time slots of a channel within the system, and/or from a time of correction or synchronization of the counters and/or clocks of the system.

The compensation component 112 is configured for compensating for a gap (a gap of time, a gap of data, a time error), which can be defined by a difference in time among a time sliced domain and real time stamp of the data. One or more bits or chunks of data can be ready for processing within the gap, in which the amount of data can vary from among the gaps. In one aspect, the compensation component 112 can compensate for these gaps based on a set of predetermined criteria and enable the application of a corrected time stamp to the sampled data for further processing.

In addition or alternatively, the compensation component 112 takes into account, as part of the predetermined criteria, an interpolation that occurs for time stamping the bits within a time slice from an arrival time and/or a departure time, namely a discrete time that is at a beginning and/or end of a word for processing. The start of a packet for the word is interpolated based on the discrete times corresponding to each word (e.g., multiple bits of sampled data within a time slice). The interpolation is performed by the system 100 because data comes in a different manner or different times, and thus a start of each packet can be at a different and at any location within a time slot of data. The start of a packet (SOP) can occur at any point within a word, and thus, to ensure that no error is introduced an interpolation function can be accounted for, which determines the offset in time from the start of the word and the start of the packet. For example, a channel of the channel(s) 116 can include an internal data bus that is a 512 bit bus, whereas the time stamping defined by an IEEE standard could use a serial format to define a sampling point (e.g., an instant at which a "Start of Frame" is seen on a network-device boundary). Thus, to get an accurate value of the arrival or departure timestamp, an interpolation is utilized, as the start of pack for the word could lie anywhere within the 512 bit boundary. This interpolation is utilized within the system for channel counters (per channel time of day counter components) and in incrementing these counters by an increment value, which will be further detailed below.

Various other predetermined criteria can be considered by the compensation component 112 for determining when and how to compensate for discrepancies among the differences in the clock rates in discrete time with interpolation functions. For example, counters, which can operate to count gaps in the data stream, can be synchronized as part of the compensation that can occur within the system 100 via the compensation component 112 based on the predetermined criteria. The predetermined criteria, for example, can include a gap count (e.g., the number of gaps occurring in the data stream) that correlates to one or more of the channels. In response to the gap count satisfying a predetermined gap count threshold (e.g., a particular number of gaps occurring within the data), the time differential of the common channel clock 110 and real time can be synchronized or compensated for, and/or the counters synchronized.

Another parameter or predetermined criteria for assessing compensation or synchronization via the compensation component 112 can include a determination as to whether the predetermined threshold is satisfied based on whether a difference between the non-discrete time and the discrete time satisfies a predetermined difference threshold, such as a predetermined difference minimum threshold and/or a predetermined difference maximum threshold. For example, in response to the gap count satisfying the predetermined number of gaps, the compensation component 112 can determine whether the differential within the gap is at, below and/or exceeding a certain threshold amount programmed into one or more data stores 106.

In addition or alternatively, the predetermined criteria for compensation can include various parameters such as a length of the word, a processing time of the channel among the channels 116, and/or a differential, or a time error data amount, that can occur between a time of day counter (not shown) corresponding to a channel 116 of the channels and a master counter (not shown) that exceeds a predetermined differential threshold. For example, the amount of time that the gaps comprise can be taken into account as predetermined criteria by the compensation component 112 for determining whether a synchronization of the clocks/counters is initiated. As such, rather than synchronizing clocks/counters for every gap, gaps satisfying a predetermined differential threshold, such as gaps having a certain amount of time without any data or an amount of data below a data threshold, can be utilized to initiate compensation (synchronization) within the gap. Gaps having a lot of data within a time slice/slot (e.g., 511 bits, or an amount close to the full data word–512 bits), rather than the entire amount of data for processing the time slice, could be ignored and not compensated for in order to not forgo processing or losing that data. On the other hand, gaps having very little data and approaching zero bits of data could be compensated for via a synchronization of the counters and/or clocks for the particular channel by the compensation component 112.

Therefore, the compensation component 112 operates to make subtle corrections by utilizing differences between a master counter and a particular channel counter (per channel time of day counter), as well as differences in time among the gaps for correction, in order to correct for differences in time within the system without introducing further error. This can be done by taking advantage of gaps at the right or optimal times by synchronizing or compensating within those gaps times via the compensation component 112. The compensation component 112 can operate to determine a differential between the per channel time of day counter and a master time of day counter, in which the predetermined criteria for initiating a synchronization event/process can comprise the differential being at or below a predetermined differential threshold, as well as compensate for an amount of correction time for the correction/synchronization operations and the interpolations for interval values at increments of the channel counters.

Figure 2:
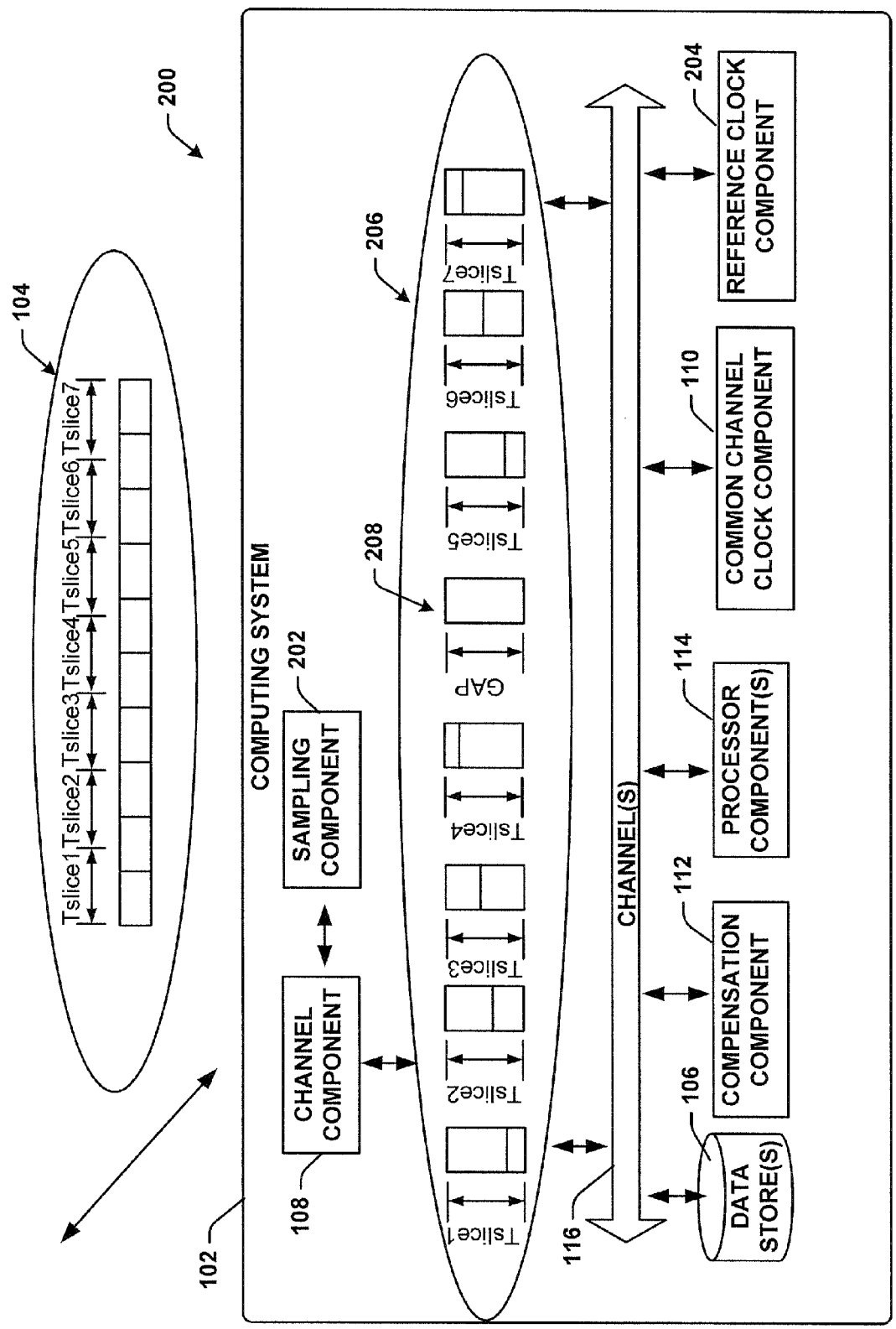
FIG. 2 illustrates another example discrete time compensating system in accordance with various aspects described herein.

Referring now to FIG. 2, illustrated is a system 200 that operates to compensate for differences in time according to various aspects of embodiments disclosed. The system 200 illustrates further detail of similar components as in FIG. 1 with the continuous data stream 104 that is received at the computing system 102. The computing system 102 is configured to receive the continuous data stream 104, which can comprise one or more packets of data therein and be of an indefinite length.

The channel component 108 can be operatively connected to a sampling component 202 samples data from the continuous data stream 104 into a discrete number of time slots having a plurality of bits of data within the discrete time domain of the common channel clock component 110. The continuous data stream 104 can comprise multiple different packets for processing, in which a start of each packet can be anywhere within a time slot (slice) of data. The continuous data 104 as illustrated has not yet been time sliced, but the time slices (e.g., Tslice1, Tslice2 . . . Tslice7, etc.) are illustrated to display the locations of the start of each packet and the variations that occur within the different time slices 206 after sampling. The continuous data stream 104 is thus a single stream of data packets, which can be received by the computing system 102, sampled from a data store 106 in large words in a time slices, and then communicated to one or more channels 116 for further processing by the channel component 108. The time slices 206 can be communicated to different channels 116 that can include different bus lines coupled to associated different systems and/or components in a discrete time. Each bus line or channel of the channels 116 can comprise a processor of the processor components 114 and comprise a different operating protocol that operates or processes data at different rates, in different amounts and in different operations depending upon the associated programming.

As stated above, the reference clock component 204 operates in real time, and the common channel clock component 112 operates at a faster clock rate than the reference clock component 204. As such, the channel component 108 can comprise a single processor operatively coupled to the common channel clock component 110 for distributing the time sliced data in a discrete time to a plurality of processors 114 via a corresponding channel 116 in parallel, concurrently and/or at the same time. The reference clock component 204 can be a primary reference clock of one or more systems that is referenced for a time stamping of the continuous data as it is received and/or stored within a data store 106 (e.g., a FIFO, or a similar data store).

The continuous data stream 104 can be sampled at a deterministic or predetermined interval by the channel component 108 reading the data store 106, or other storage that stores or receives the data stream. Because the data is read from the FIFO or data store 106 without pause and at a faster rate than the reference clock component 204, gaps (e.g., GAP 208) are introduced into the process, in which a time interval is introduced in which no word of data was read because there was an insufficient amount of bits or data within a word for a full word (e.g., 512 bits) to be read from data store 116 or processed through the system 200 to a processing pipeline (e.g., a single channel 116 of the channels and a single processor 114 of the processors, or a combination of channels and processors). Because the common channel clock 110 operates in the time slice domain (the faster time rate in which the continuous data stream is sampled into slices or time slots and communicated) at a faster rate than reference clock component 204 for time stamping arrival of the data 104 in real time sampling intervals or gaps 208 result in the time sliced data, which is further compensated for via the compensation component 112 in order for the system to apply a corrected time stamp or one that is correct with reference to the reference clock component 204 for the plurality of channels 116 and processors 114 of various systems.

Figure 3:
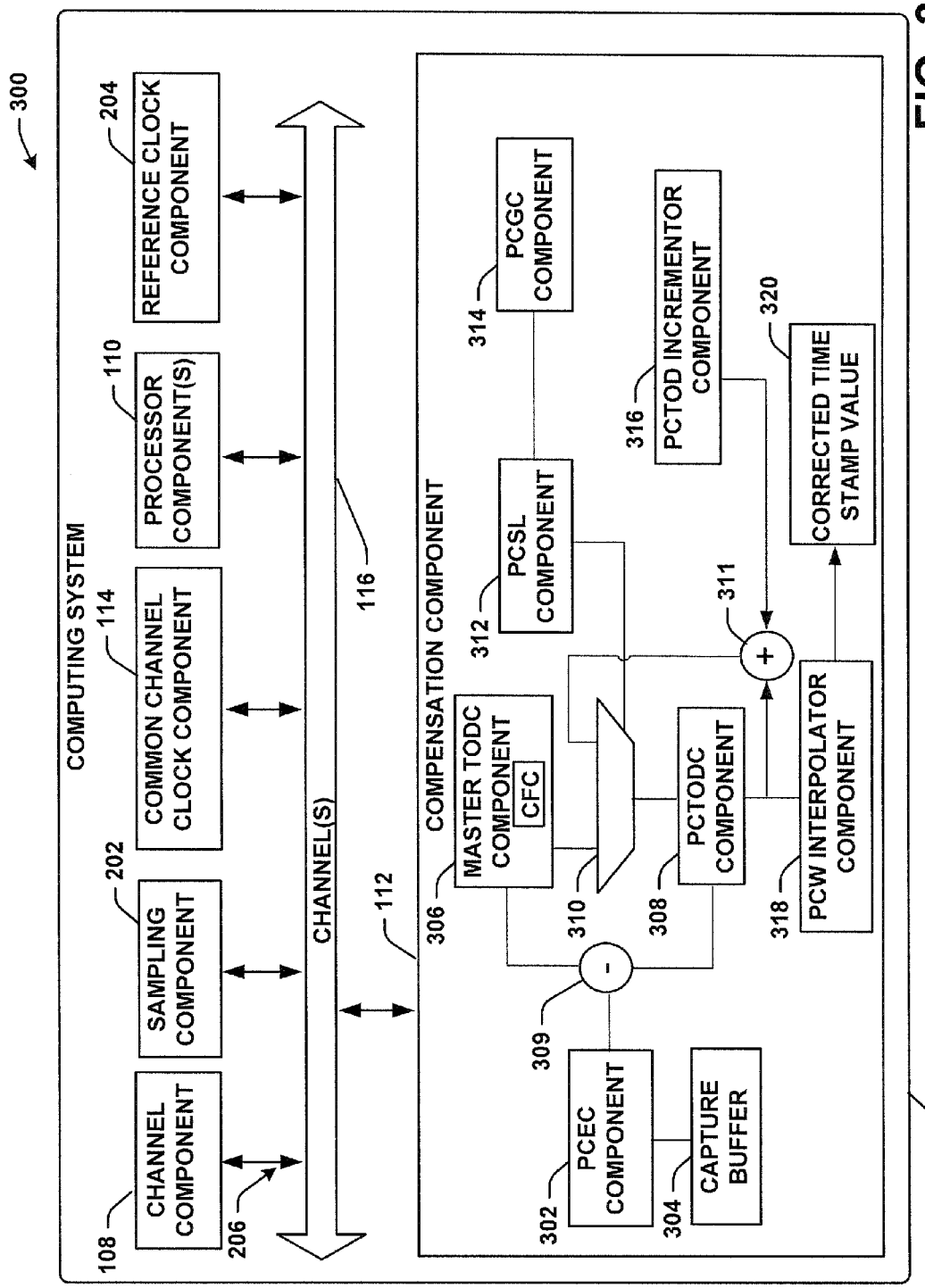
FIG. 3 illustrates another example discrete time compensating system in accordance with various aspects described herein.

Referring now to FIG. 3, illustrated is a system 300 that compensates variations in time stamping variations processes from a non-discrete time domain and a discrete time domain in accordance with various embodiments. The system 300 comprises similar components as described above. The compensation component 112 comprises various components that operate to determine the times, intervals and increment values involved in an accelerated discrete time domain for time compensation among different systems or components having different clock speeds. The compensation component 112 comprises a per channel error comparator (PCEC) component 302 coupled to a capture buffer 304, a master time of day counter (TODC) component 306, per channel time of day counter (PCTODC) component(s) 308, per channel synchronization logic (PCSL) component(s) 312, per channel gap counter (PCGC) component(s) 314, per channel time of day (PCTOD) incrementor component(s) 316, and per channel word interpolator component(s) 318. The "per channel" components, such as the per channel error comparator component 302 and other "per channel" components discussed can correspond to or be associated with a single channel of the channels 116 and include logic devices and/or counters for incrementing, for example, in which the compensation component 112 can include one or more of these based on a number of channels 116. For example, the channels 116 can comprise ninety-six different channels, and the "per channel" components discussed can comprise the same number of respectively components, such as ninety-six per channel error comparator components 302.

The compensation component 112 generates compensations for various discrepancies in time stamping processes as discussed above. In particular, time slicing and interpolations for a start of a packet based in the width/length of the word can introduced significant errors in the time stamping processes. For example, the data streams of continuous data can be simultaneously received and/or transmitted by the system 300 at each channel single shared time slicing hardware (e.g., a processor, logic arrays or the like) resources process the streams of data sequentially, meaning during one round of processing, in which the time is approximately the same for. The data streams can be processed at a much higher faster clock rate than real time in order to overcome utilization inefficiencies within the hardware blocks. Because data is gathered in a large word, rather than a continuous stream of data for processing, the common channel clock component (e.g., a discrete time domain clock) 114 operates faster than the incoming data stamp from the reference clock component 204, which prevents too much data being received than can be actually processed at any one time period. This introduces gaps in the time slots of data that are then compensated for by the compensation component 112.

An interpolation function for the start of packet for each word is also compensated for by the compensation component 112. The channels 116 can include internal data bus lines for communicating within different processing pipelines at different protocols having different processing times, rates, etc. and among the system 300 components. The internal data bus of the channels 116 can comprise a 512 bit bus, for example. Certain time stamping standards use serial formats to define precise sampling points (instants at which a "Start of Frame" is seen on a network-device boundary). Thus, the system 300 obtains the precise values of the arrival and/or departure timestamp by an interpolation process because the "Start of Packet" can be anywhere within the bit boundary of the time slots. For example, because the system operates to process the continuous data stream in large words, the time slots of the discrete time domain have a value at the top of the word and a value at the bottom, in which are integrated or smoothed out by interpolation. For example, a word can have 512 bits that takes 50 nanoseconds to get processed. If the time slot data is at bit number 58, this could be higher or lower in time than at another bit number 300, thus an interpolation of the start of packet occurs because data comes in at a different manner. The compensation component 112 is configured to account for the gaps and the interpolation processes during chosen gap times for resynchronization. The times and mechanisms for choosing which gaps to compensate in according to a set of predetermined criteria are further discussed below with the components of the compensation component 112.

The per channel error comparator component 302 is coupled to a capture buffer 304, and operates at intervals or gaps that are chosen for synchronization processes by computing the difference between the master time of day counter component 306 and the per channel time of day counter component 308. In response to the differential determined by the per channel error comparator component 302 for a channel satisfying a predetermined differential threshold, the error value (difference) and the time count of the master time of day counter component 306 are captured in the capture buffer 304 and an interrupt can be asserted by the system 300. The capture buffer 304 can include at least two buffers for a current error time of day and a previous error time of day in order for a determination to be, for example, of the interval between error threshold events, in which the error satisfies the predetermined differential threshold. In one embodiment, the predetermined differential can be satisfied when the differential is greater than a predetermined maximum threshold as part of the predetermined criteria for compensation/resynchronization processes to occur. In another embodiment, the predetermined differential can be satisfied when the differential is at or below a predetermined minimum threshold, which is further discussed below as one compensation mechanism to correct for variations within the gaps occurring.

The master time of day counter component 306 can comprise a counter that operates in synchronized time with the reference clock component 204, which is a primary reference clock that clocks at a real time rate or in the non-discrete time domain. The master time of day counter component 306 can be coupled to a data selector 310 (e.g., a multiplexer) and also to an adder 309 that is configured for determining a time count differential between the master time of day counter component 306 and the per channel time of day counter 308. In one embodiment, the master time of day counter component 306 can include more than one counter as well as a correction field counter (CFC). The correction field counter (CFC) can be an internal or external counter operatively coupled to the master time of day counter component 306 that operates to enable tracking and correction of the time that the a resynchronization mode occurs or for the time compensation/resynchronization occurs in the compensation component 112.

Figure 6:
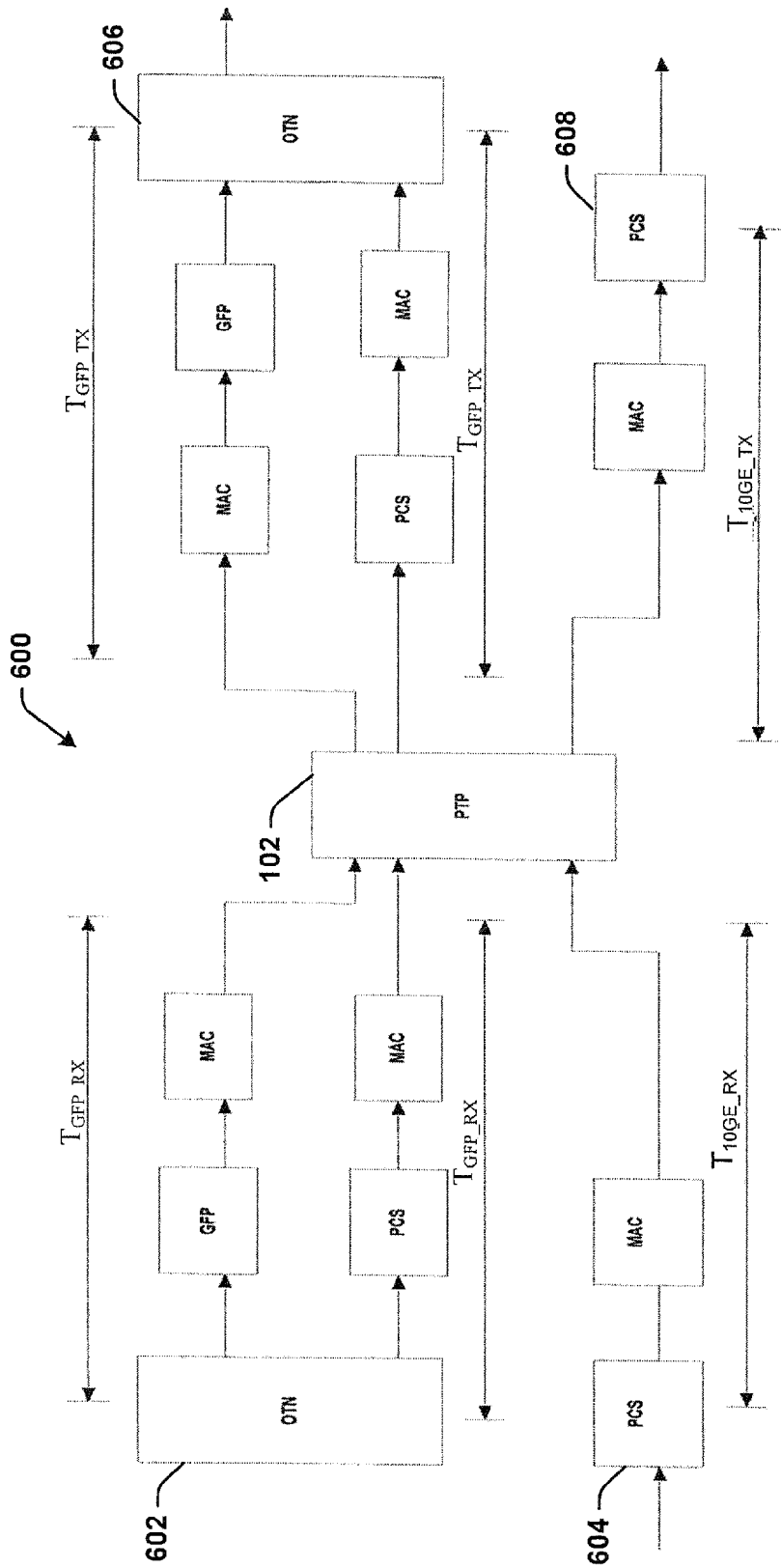
FIG. 6 illustrates an example input and output channel pipelines of a discrete time compensating system in accordance with various aspects described herein.

The per channel time of day counter component 308 can correspond to a channel 116, in which the compensation component 112 can comprise a plurality of per channel time of day counters 308 that correspond respectively to channels. The per channel time of day counter 308 is configured for incrementing based on an increment value that is independent per channel among the plurality of channels respectively. Because each channel and corresponding processor 110 can process data according to a different protocol, the word length, processing time for the channel and other like parameters can vary from one another, for example. Therefore, the increment interval of the per channel time of day counter components 308 can vary among each of the per channel time of day counter components 308. As such, the per channel time of day counter component 308 operates to track the time of day for a given channel. In response to a time slot having an amount of data that is sufficient for processing in a channel, the per channel time of day counter component 308 increments the time of day. When gaps (e.g., the gap 206) occur, such as a time slot with no or insufficient data for processing in a pipeline, the per channel time of day counter component 308 is not incremented. In addition, depending upon the synchronization logic or the specific gaps that are chosen for resynchronization, the per channel time of day counter component 308 can be updated with a value from the master time of day counter component 306 via the signal selector component 310. The per channel time of day counter component 308 is among one of the counters present for each channel along with the correction field counter (CFC), which can also be individually associated with each channel as illustrated at FIG. 6, and discussed infra, for example.

The per channel synchronization logic component 312 operates to determine when the master time of day counter component 306 is used in a compensation routine or for resynchronization processes that involve synchronizing the counters with the master time of day counter component 306 that corresponds to the primary reference clock component 204. The per channel synchronization logic counter component 312 of a channel is operatively coupled to the per channel gap counter component 314, which is configured to count gaps (time slots without data) that occur among the time slots being communicated through the system 300. The per channel synchronization logic components 312 can operate to compare the gap count with a programmable/predetermined gap count threshold and determine whether the gap counts satisfies this threshold. The logic of the per channel synchronization logic components 312 signals the signal selector 310 to communicate to the per channel time of day counter component 308 for updating, synchronization based on the mater time of day counter component 308, and/or, in other words, a compensation event. The logic of the per channels synchronization logic component(s) 312 can be programmed to be disabled at times and/or for different channels independently via the system 300.

In another embodiment, the per channel time of day counter component 308 for a channel can be updated, synchronized, reinitiated and/or reset for compensation based on the master time of day counter component 306 in response to the predetermined differential (time error) determined by the per channel comparator component 302 being at or below a predetermined minimum threshold, and further in response to the gap count of the per channel gap counter component 314 satisfying a predetermined gap count threshold. As stated above, the predetermined differential can also be satisfied when the differential is greater than a predetermined maximum threshold as part of or entirely as the predetermined criteria for compensation or resynchronization processes to occur.

The thresholds discussed can be dependent upon a nominal time of arrival of gaps, which implies that the error performance depends on the data rate. Once the discrete time of the counters are synchronized to the real time of the reference clock component 204 through the master time of day counter component 308, the correction time can have an error with the real time, in which the error can comprise a fixed component and a variable component. The thresholds operate within algorithms discussed further below to minimize the variable component while leaving the fixed component unaffected by treating it as a constant while the common channel clock component 114 and/or counters are synchronized with the master reference clock component time 204 in the synchronization operations.

The per channel time of day incrementor component(s) 316 can be configured for incrementing the plurality of per channel time of day counters with the increment value associated with the plurality of channels based on an amount of time that a respective channel of the plurality of channels accumulates the data for a predetermined word length. The plurality of channels process the data in time slots concurrently and at different speeds from one another, and thus, the per channel time of day incrementor components 316 determined the increment value that the per channel time of day counter 308 is incremented when time slots of data are communicated for processing via the particular channel of the channels 116. In one embodiment, the per channel configured for modifying the increment value of a channel based on a variance of differentials between a per channel time of day counter of the plurality of per channel time of day counter components 308 and the master time of day counter at gaps that are selected for synchronization.

Because the processing time that the different channels of the channels 116 operate can vary, the per channel time of day incrementor component 316 is configured to increment based on the corresponding channel. In addition, because the common channel clock component 114 operates at a faster clock rate (in a discrete time domain) compared to the reference clock component 204 operation (in a non-discrete time), the timestamp are asynchronous and the per channel time of day incrementor component 316 can operate to modify the intervals within a channel to determine what a time increment should be and how much time is allowed for a clock increment. For example, if a channel operates at ten gigabytes, it is going to have one time parameter or one time increment, whereas if a channel is running at a channel with 40 Gigabytes the time is going to be incrementing time 4 times faster, in which the per channel time of day incrementor components 316 compensate for.

The per channel time of day incrementor components 316 increments each clock tick in normal operation in the high speed domain. An increment value is used to increment time as reflected by how much time it takes to accumulate all the data in a word for the particular channel. For example, if there is a 512 bit word and it takes an amount of time (e.g., 50 nanoseconds and/or another amount) to accumulate, when a word of data is detected in a particular channel, the per channel time of day incrementor component 316 can increment the per channel time of day counter component 308 by associated amount of time with the particular channel At time slots having gaps of data, no increment occurs in time. For example, if a clock cycle is 4 ns long, and in that time period 40bits accumulate in about 12 cycles, for example, the real time could be 48 ns of real time, but in discrete time every time there is a clock tick that represents a different amount (e.g., 50 ns or other amount) instead of 48 ns. The difference or discrepancy could be about 3 ns, for example, in which the system will slowly start to drift off from synchronization.

The compensation component 112 operates to examine the gaps that arise from among data slots that have no data read therefrom. Because the common channel clock component 114 increments by 50 ns within the gap time, what happens is that synchronization is close to the reference clock component 204, but not always precise. As such, the per channel time of day incrementor components 316 operate to increment the amount of time when data is detected, and does not increment when data is not detected such as in the gaps.

The compensation component 112 operates further to determine when and at which gaps a correction, synchronization event, and/or, compensation occurs. A gap can have a number of data bits associated with the gap that have not been detected, for example, because the continuous data is being sampled. If a correction occurs, the data bits could be unaccounted for or not processed. Therefore, the compensation component 112 comprises correction mechanisms for indicating the time to perform a correction, but the per channel error comparator component 302 (performing the error measurement) indicates whether the distance or difference between the discrete time and the real time is too large, or not large enough, in which otherwise making a correction or synchronization event then will introduce more errors. Thus, in one embodiment, corrections, synchronizations and/or compensations are performed to make subtle adjustments when the difference between the real time clock domain (non-discrete time) and the discrete the discrete time domain is very small.

For example, one synchronization event could occur at a time when the clocks were off by 4 ns, in which the system determined that 4 ns is small enough of a discrepancy to synchronize. The timestamps could be captured in the capture buffers 304, and further, the next time the system synchronizes, the system could be off by another 4 ns or 8 ns, for example, and thus, the system 300 can operate to measure whether the discrepancy amount is consistently off by a certain amount or is varied. The per channel time of day incrementor components 316 can be modified to change the time of day increment so the increment value can be more accurate, namely as an adaptive mechanism that allows compensation component 112 of the system 300 to increase or change the accuracy of the counter itself.

The per channel time of day incrementor component 316 communicates the increments to an adder 311 that combines the per channel time of day counter component value with the increment values. The combined signal is then coupled to the selector device 310 with a signal from the master time of day counter component 306, the synchronization logic from the per channel synchronization logic component 312, and/or from the adder 311. Based on the operation in a normal operating mode, or a synchronization mode of operation in which a synchronization event occurs, the per channel time of day counter component 308 can be corrected with a signal from the adder 311 and communicate a value to the adder 311 and the per channel word interpolator component 318.

The per channel word interpolator component 318 is configured for determining a time offset from a start of a packet within the data of the predetermined word length in a time slot and a location within the packet to prevent an introduction of a time error. The compensation component 112 is further configured for modifying the increment value of the plurality of per channel time of day counters based on the time offset.

Figure 4:
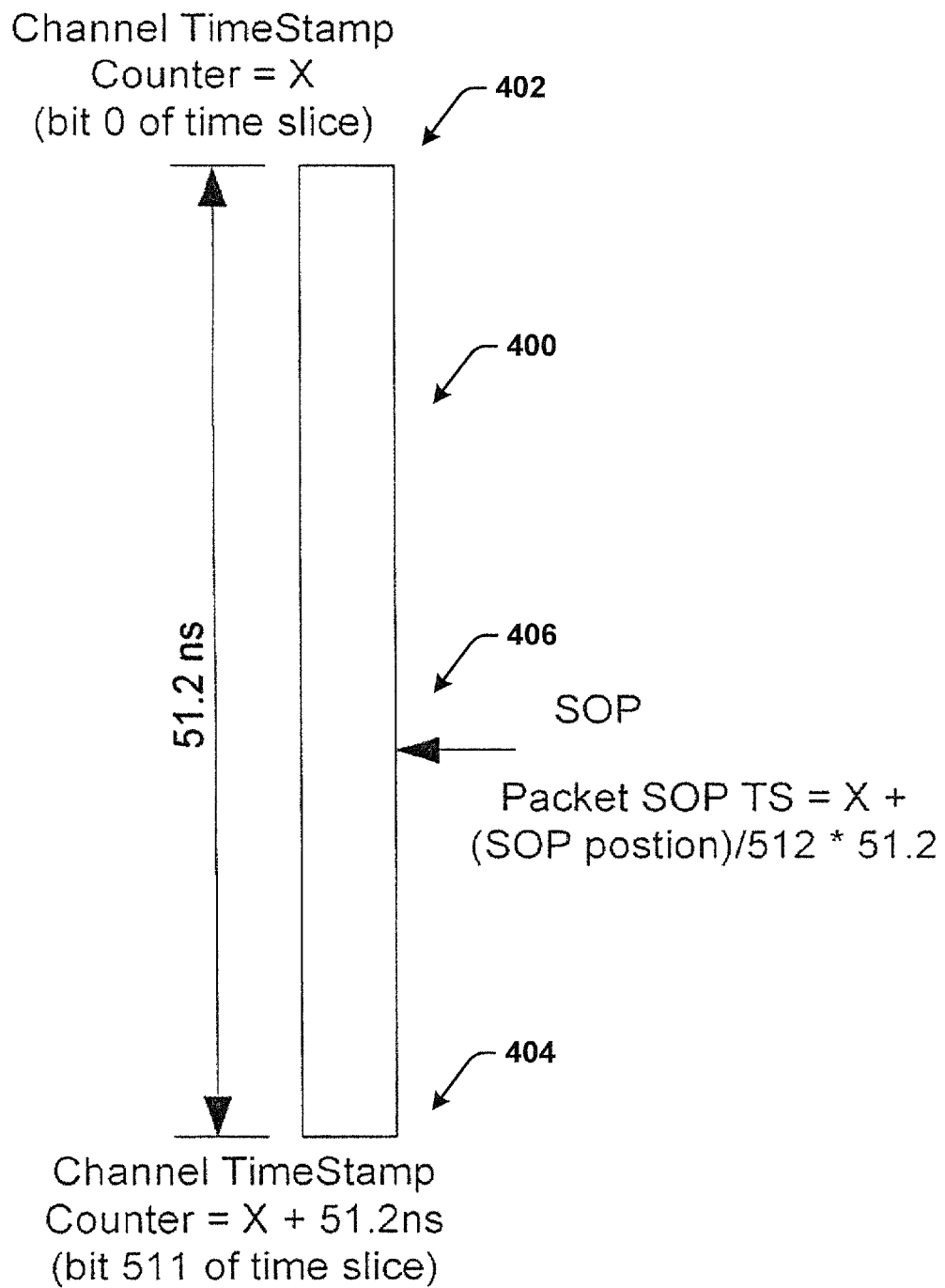
FIG. 4 illustrates an example time slice interpolation in accordance with various aspects described herein.

Referring to FIG. 4, illustrated is an example of a time slice (time slot) 400 of a word comprising multiple bits that is processed in accordance with various embodiments disclosed herein for interpolation. For example, one or more per channel word interpolator components 318 can operate to generate an interpolation function that identifies a time offset that can be added to the current view of time (the timestamp relative to the top/start of the world) in order to obtain an accurate start of packet time stamp. The start of packet can lie anywhere within a word of a time slice and can vary from time slot to time slot. As such, the per channel word interpolator components 318 operate to provide an interpolation function for each time slot of data.

The time slot 400, for example, comprises a first discrete time 402 that has one value at the top of the word and a second discrete time 404 that has one value at the bottom, and thus, the per channel word interpolator components 318 integrate or smooth the differences of the first discrete time 402 and the second discrete time 404. For example, the time slot 400 could comprise 512 bits that takes 50 nanoseconds to accumulate and process. Thus, the data is interpolated according to an interpolation function to smooth an offset in which the packet is initiated at number 58 and the data is at a higher time, such as at number 300. As such, because data comes in at a different manner at different times, an interpolation is provided for by the per channel word interpolator components 404.

A start of packet (SOP) is located at the location 406, which can be at one bit position within a word of the time slot 400. The per channel position or location 406 can be determined as the time stamp of the SOP of the packet as X plus (SOP position) divided by the predetermined word length (e.g., 512) multiplied by the time to process the time slot for the given channel (e.g., 51.2 ns), in which X is the initial time at bit zero or starting point of the time slice.

At start up, the per channel time of day counter components 308 are synchronized with the master time of day counters. Each time a channel is serviced and comprises data (the time slots), the per channel time of day counter components 308 incremented by an increment value of time. As shown below, the increment represents a step function that increases in the per channel time of day counter component 308. In order to smooth the step function and approach a real time, the interpolation is used to determine the actual time of the start of packet (SOP) location. As discussed above, intervals or gaps exist or occur in which the channel is serviced (synchronized in a synchronization event) and there is no data and/or a data amount that satisfies a predetermined threshold minimum or maximum. During the chosen time slots in which a gap occurs, there is no advance in the per channel time of day counter components 308 while the master time of day counter component 306 continues to increment. These intervals are taken advantage of according to the various criteria discussed in order to compare and resynchronize the per channel time of day counters as a synchronization event.

Figure 5:
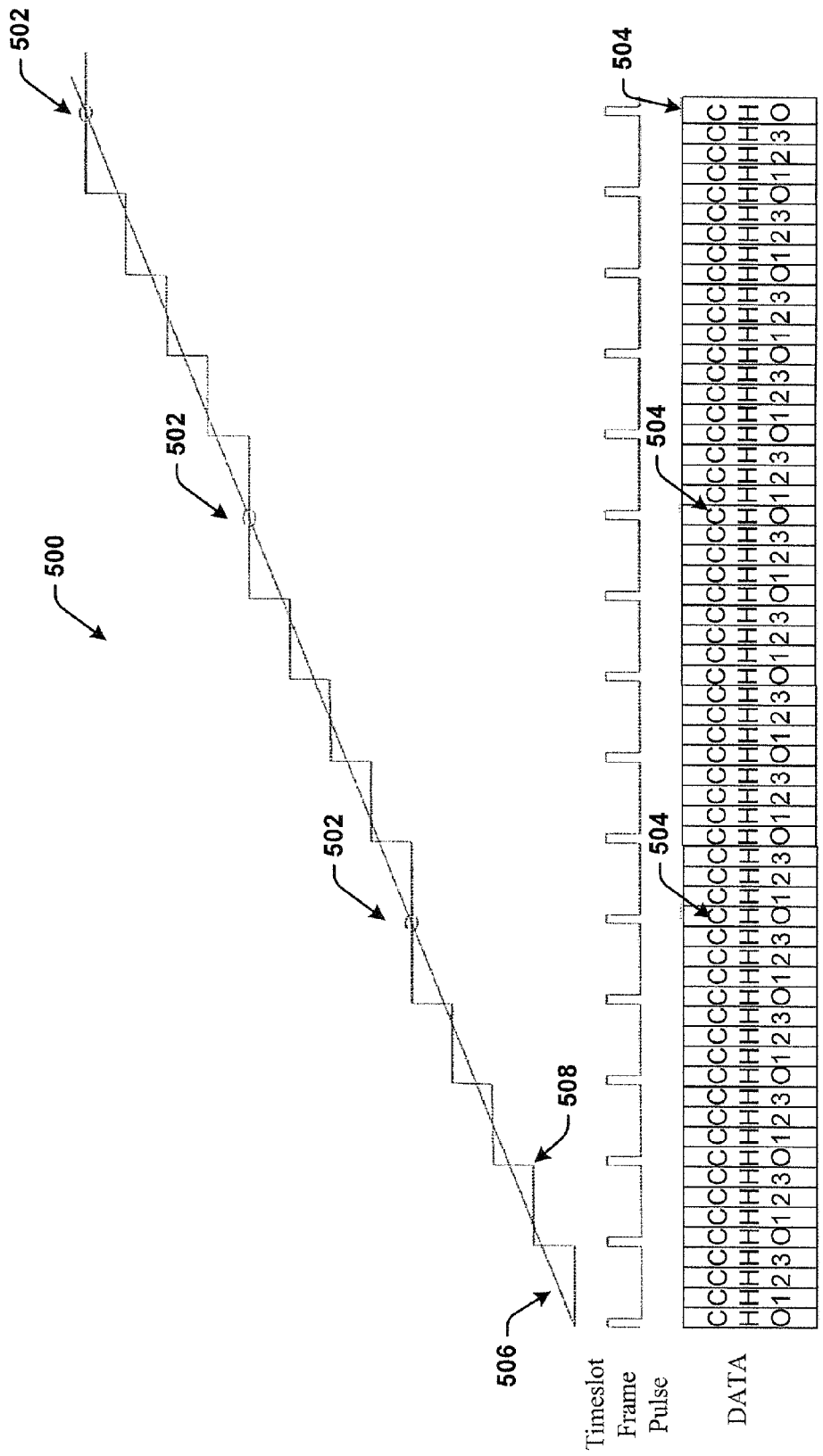
FIG. 5 illustrates an example time progression between non-discrete time of a reference clock and a discrete time of a channel clock in accordance with various aspects described herein.

Referring now to FIG. 5, illustrated is a graph 500 of time progressions for a non-discrete time and a discrete time in accordance with various embodiments described. The graph 500 illustrates intervals or gaps 502 that exist or occur in which the channel is serviced (synchronized in a synchronization event) and there is no data and/or a data amount that satisfies a predetermined threshold minimum or maximum. The time slots data is processed in parallel within the various channels (e.g., 0 thru 3) that can comprise more or less channels, for example, that process discrete time slots in multiple bit words. During the chosen time slots (which can be set to processes in any one particular channel, not necessarily the same channel each time) in which a gap occurs, there is no advance in the per channel time of day counter components 308 while the master time of day counter component 306 continues to increment. The master time of day counter component 306 is set to increment in real time, which is delineated by the linear line 506 and the per channel time of day counter component 308 increments in a step wise function that is delineated by the step line 508. The intervals 504 that have no data can be taken advantage of according to the various criteria discussed in order to compare and resynchronize the per channel time of day counters 308 at a synchronization event 502, in which the per channel time of day counter 502 is synchronized with the master time of day counter component 306.

In one embodiment, the gaps 502 can occur at irregular intervals, rather than every so many steps, at the same period of time and/or channel number. The gaps are therefore utilized to make a synchronization or compensation of the counters for differentials occurring among the clocks at only certain gaps that satisfy a set of predetermined criteria, such as a predetermined maximum differential threshold, a gap count threshold, and/or a predetermined minimum differential threshold, as discussed above.

Referring now to FIG. 6, illustrated is an example of a channel architecture in accordance with the embodiments described. The computer system 102 is illustrated as a Precision Time Protocol system (PTP) and/or other protocol system that is used to synchronize time throughout a network 600. On a local area network or other network the system can achieve clock accuracy in a microsecond and/or nanosecond range, enabling measurement and control systems to be accurate and precise, for example.

The computing system 102 is configured for supporting multiple different protocols, in addition to PTP protocol by which each channel of the channels 116 discussed above can comprise independent processing pipelines having independent processing protocols. Each protocol can be have different operational parameters such as different processing times, in which one channel can take longer for data to process through, for example. Consequently, the inputs have independent delays that are compensated for on a per channel basis as discussed with the components above.

In one example, the computing system 102 can have inputs from different pipelines of different protocols of an Optical Transport Network (OTN) 602 as a set of Optical Networks (ONE) connected via optical fiber links or other connections, able to provide functionality of transport multiplexing, switching, management, supervision and survivability of optical channels carrying client signals among different line rates or protocols via different channels into the computing system 102. Additionally or alternatively, other network connections can be provided as inputs to the computing system 102, such as from a Physical Coding Layer (PCS) that can define physical layer specification (e.g., speed, Duplex modes, etc.) for networking protocols like Faster Ethernet, Gigabit Ethernet, 10 Gigabit Ethernet, etc., with a data link layer having a Logical Link Control Sublayer, a Media Access Control Sublayer, etc.

The example architecture of FIG. 6 illustrates three different input pipelines having different delays that are accommodated and compensated for in the build out. Each input as discussed is compensated by the system 102 according to the independent delays ($T_{GFP\_RX}$, $T_{otu2e\_RX}$, $T_{10GE\_Rx}$) and communicated with corrected time stamps accordingly in the channels 116 with compensated delays (e.g., $T_{GFP\_TX}$, $T_{otu2e\_TX}$, $T_{10GE\_TX}$) as transmission or outputs lines to other system layers 606 and 608.

Example Methods of Discrete Time Compensation Mechanisms

While the methods or process flows described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
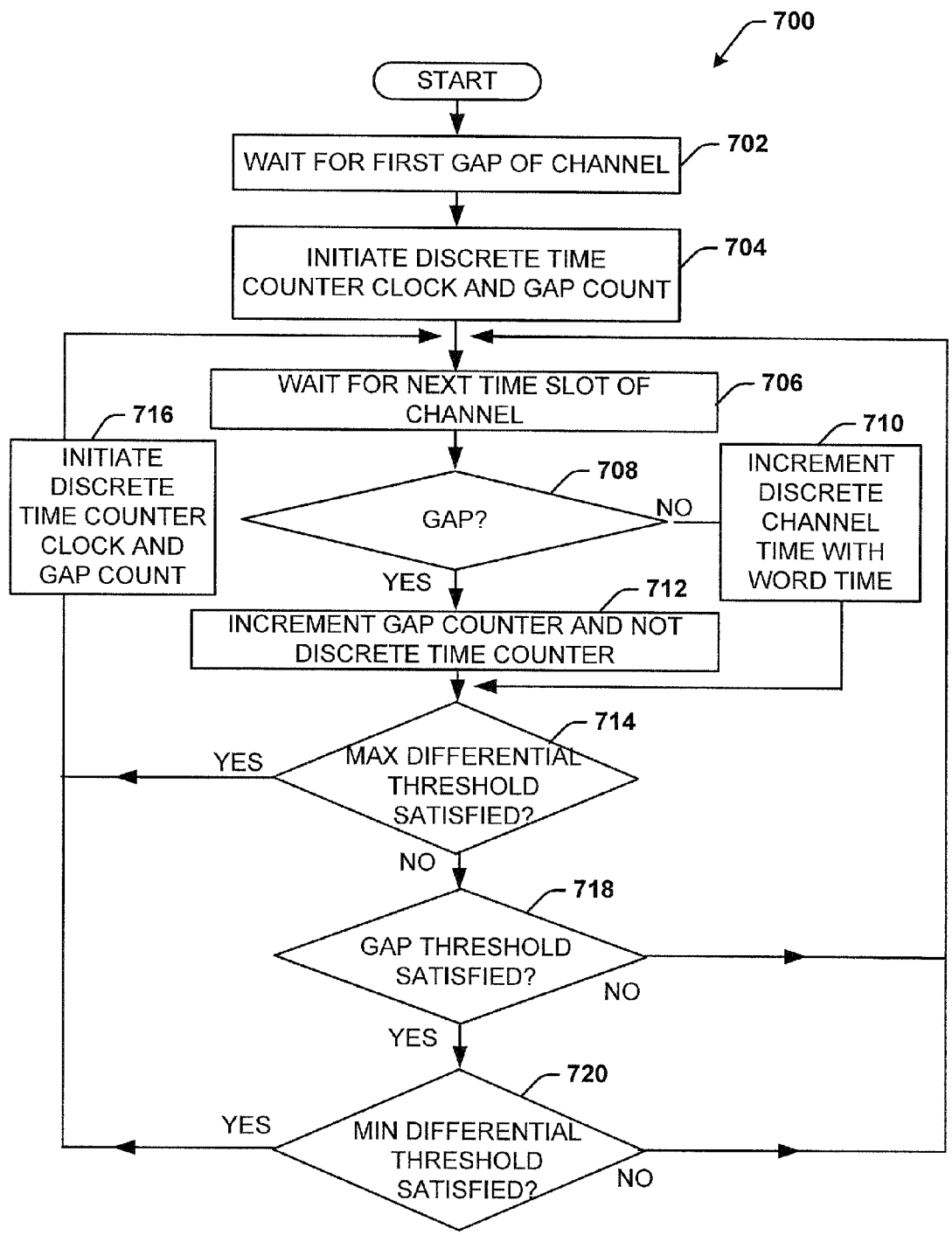
FIG. 7 illustrates an example flow diagram in accordance with various aspects described herein.

An example process flow 700 for time slicing systems to compensate for asynchronous clocks is illustrated in FIG. 7. Gaps comprises no data or insufficient data for processing within a time slot are introduced as a result of differences in a real time reference clock and a common channel clock in a discrete time domain as discussed above. Interpolation for the start of packet determination, channel protocol parameters and the like can further be utilized in the compensation mechanisms for determining the manner of synchronization. Further, the gaps in data can occur in an irregular manner at different intervals from one another. As such, the synchronization events, which comprise the times at which the counters are reset, synchronized, and/or compensated for differences are selected by the system to occur at optimal times and at gaps that will introduce the least amount of error while also providing as little a loss in sampled data as possible.

The process flow 700 initiates, and at 702 a wait mode occurs for a gap of a channel among a plurality of channels. At 704, a discrete time counter, (e.g., a per channel time of day counter) that increments with the processing of time slot of a channel is initiated, zeroed, or synchronized with the system clock or master time of day counter set to a real time reference clock. A gap count counter is also initiated for counting gaps or intervals of time that occur with less sampled data than can be processed for the particular channel.

The process flow 700 then waits for a next time slot at 706. At 708, a determination is made as to whether a gap is present, in which sampled data is not present for a predetermined word length for processing based on the protocol of the channel. A decision is made at 708 that flows to 710 if there is no gap, in which the per channel time of day counter can be incremented with a word time or the time for processing a time slice or word based on the particular channel protocol. If a gap is determined present at the decision 708, the process flows to 712 and a gap counter is incremented without the discrete counter time being incremented.

At 714, a decision is made as to whether a differential between a non-discrete time and a discrete time is satisfied. For example, the differential can comprise a different between the system clock time that a master time of day counter is synchronous with and a per channel time of day counter that operates in the discrete time for processing time slots. The differential is determined as being satisfied, for example, if the differential is above a maximum threshold. The threshold could also be set to determine a time between gaps that occurs, since the gaps can be at irregular intervals and/or the time between the master time of day counter in the non-discrete time and the per channel time of day counter operated in the discrete domain. If the threshold is satisfied, then the decision is "YES" and the process flows to 716 to initiate the discrete time counter (e.g., the per channel time of day counter) and the gap counter in a synchronization event. Then, the process continues as described above.

If the decision at 714 is "NO", then the process flows to 718 to determine whether a gap threshold is satisfied. For example, the gap threshold could comprise a certain number of gaps occurring in a predetermined amount of time, from the last synchronization event, and/or in which no synchronization event has yet to occur. If the answer to the determination is "NO" the process cycles through process flow starting at 706 to wait for the next time slot of the channel. However, if the determination is "YES", the process flows to the decision at 720.

The decision at 720 of the process flow generates a determination for whether a minimum differential threshold is satisfied. The differential is determined as being satisfied, for example, if the differential is below a minimum threshold. The threshold could also be set to determine a time between gaps that occurs, since the gaps can be at irregular intervals, and/or the time between the master time of day counter in the non-discrete time and the per channel time of day counter operated in the discrete domain for determining a time differential minimum. If the threshold is satisfied, then the decision is "YES" and the process flows to 716 to initiate the discrete time counter (e.g., the per channel time of day counter) and the gap counter in a synchronization event. Then, the process continues as described above. If the answer to the determination is "NO" the process cycles through process flow starting at 706 to wait for the next time slot of the channel.

The process flow 700 thresholds can be dependent on the nominal time of arrival of gaps, which implies that the performance depends on the data rate for the channel. Once the channel clock time is synchronized to the system time or reference time that the master time of day counter is synchronized with, the channel clock (common channel clock) will have an error with the ideal time. This error comprises a fixed component and a variable component. The process flow 700 is configured to minimize the variable component only. The fixed component can be undetermined, but can remain constant as long as the clocks in discrete time and non-discrete time are synchronized.

Figure 8:
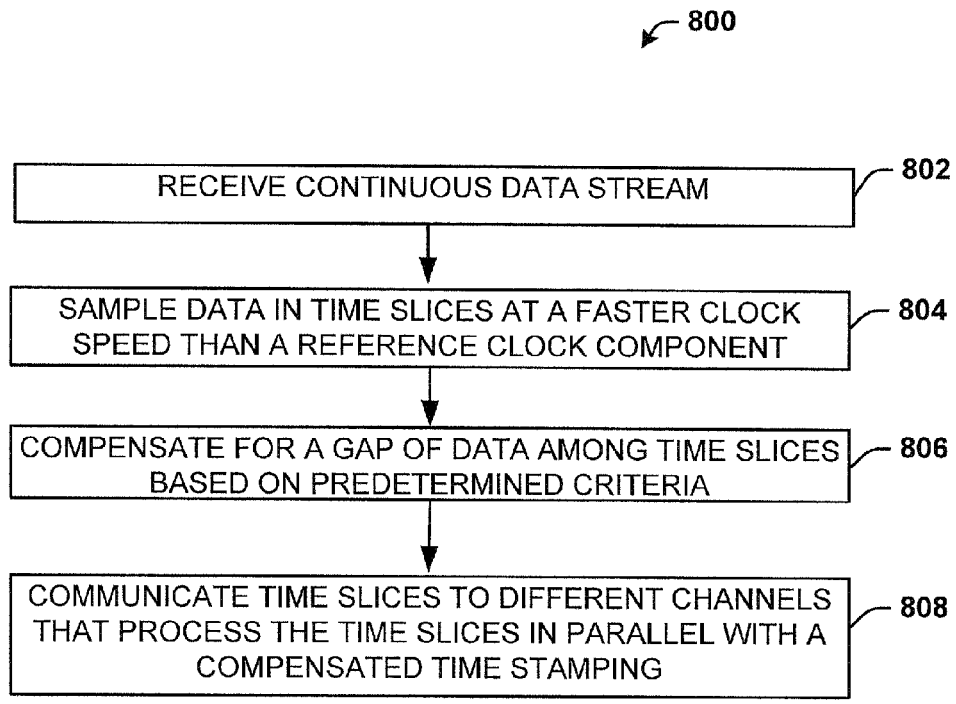
FIG. 8 illustrates another example of a flow diagram in accordance with various aspects described herein.

FIG. 8 illustrates another exemplary method 800 for discrete time compensation among channels of one or more systems or system components. At 802 a continuous data stream that is in a non-discrete time domain based on a reference clock component is received by the system. At 804, data of the continuous data stream is sampled in time slices in a discrete time domain with a common channel clock component that is faster than the reference clock component. At 806, a gap of data is compensated for among the time slices based on a set of predetermined criteria with a compensated time stamping. The gap can be compensated for a synchronization event in which the counters are synchronized and the per channel time of day counter (component) is set to the value of the master time of day counter, for example. The time slices can be communicated to different channels that process the data of the time slices in parallel, with the compensated time stamping.

Exemplary Networked and Distributed Environments

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 9:
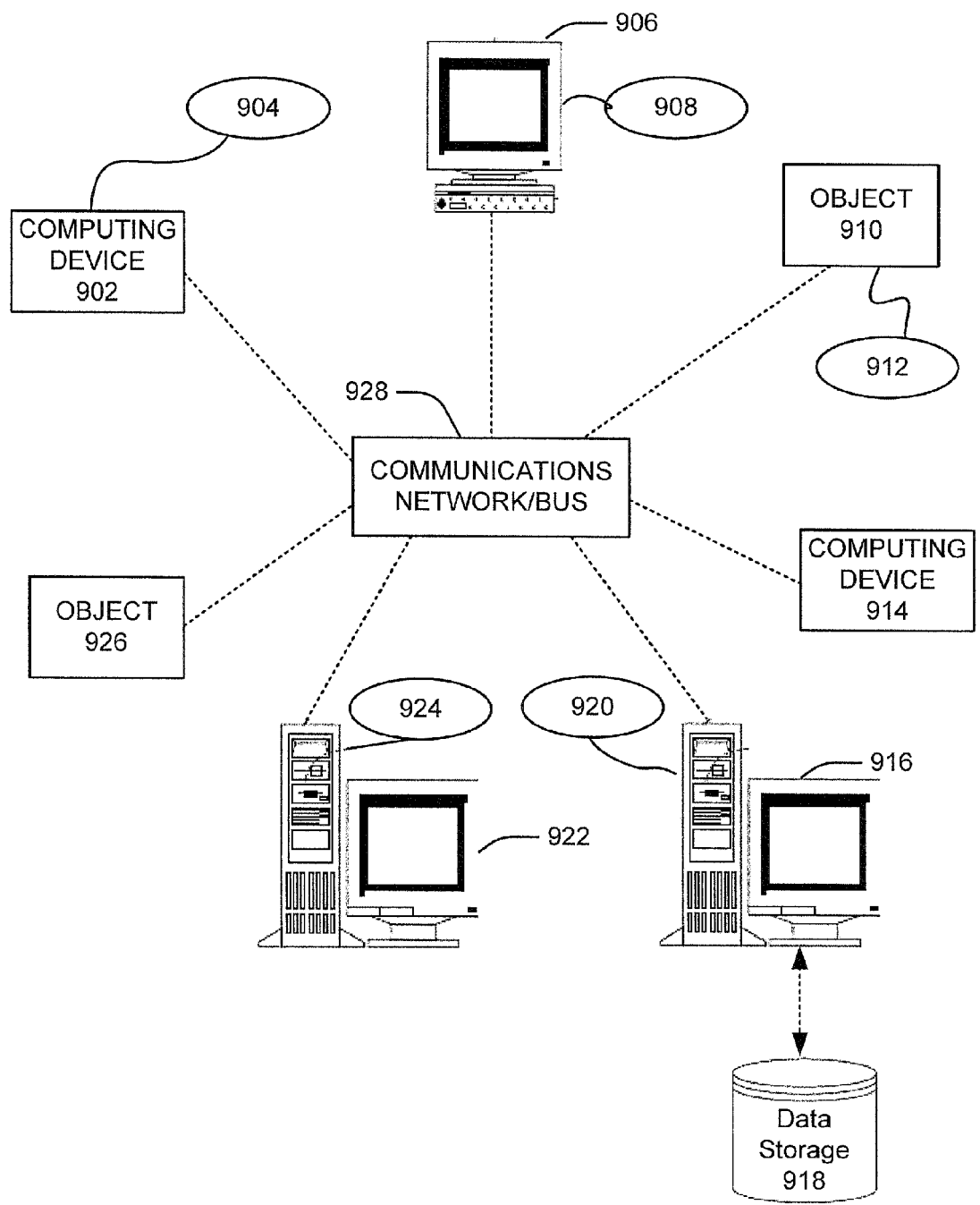
FIG. 9 is a block diagram representing exemplary non-limiting networked environments in which various non-limiting embodiments described herein can be implemented.

FIG. 9 provides a schematic diagram of an exemplary networked or distributed computing environment. The distributed computing environment comprises computing objects 910, 926, etc. and computing objects or devices 902, 906, 910, 914, etc., which may include programs, methods, data stores, programmable logic, etc., as represented by applications 904, 908, 912, 920, 924. It can be appreciated that computing objects 912, 926, etc. and computing objects or devices 902, 906, 910, 914, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, etc. can communicate with one or more other computing objects 910, 912, etc. and computing objects or devices 920, 922, 924, 926, etc. by way of the communications network 928, either directly or indirectly. Even though illustrated as a single element in FIG. 9, communications network 928 may comprise other computing objects and computing devices that provide services to the system of FIG. 9, and/or may represent multiple interconnected networks, which are not shown. Each computing object 910, 926, etc. or computing object or device 920, 922, 924, 926, etc. can also contain an application, such as applications 904, 908, 912, 920, 924, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 9, as a non-limiting example, computing objects or devices 920, 922, 924, 926, etc. can be thought of as clients and computing objects 910, 926, etc. can be thought of as servers where computing objects 910, 926, etc., acting as servers provide data services, such as receiving data from client computing objects or devices 920, 922, 924, 926, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 926, etc. can be Web servers with which other computing objects or devices 920, 922, 924, 926, etc. communicate via any of a number of known protocols, such as the hypertext transfer protocol (HTTP). Computing objects 910, 912, etc. acting as servers may also serve as clients, e.g., computing objects or devices 920, 922, 924, 926, etc., as may be characteristic of a distributed computing environment.

Exemplary Computing Device

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting embodiments, i.e., anywhere that a device may wish to engage on behalf of a user or set of users. Accordingly, the below general purpose remote computer described below in FIG. 10 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
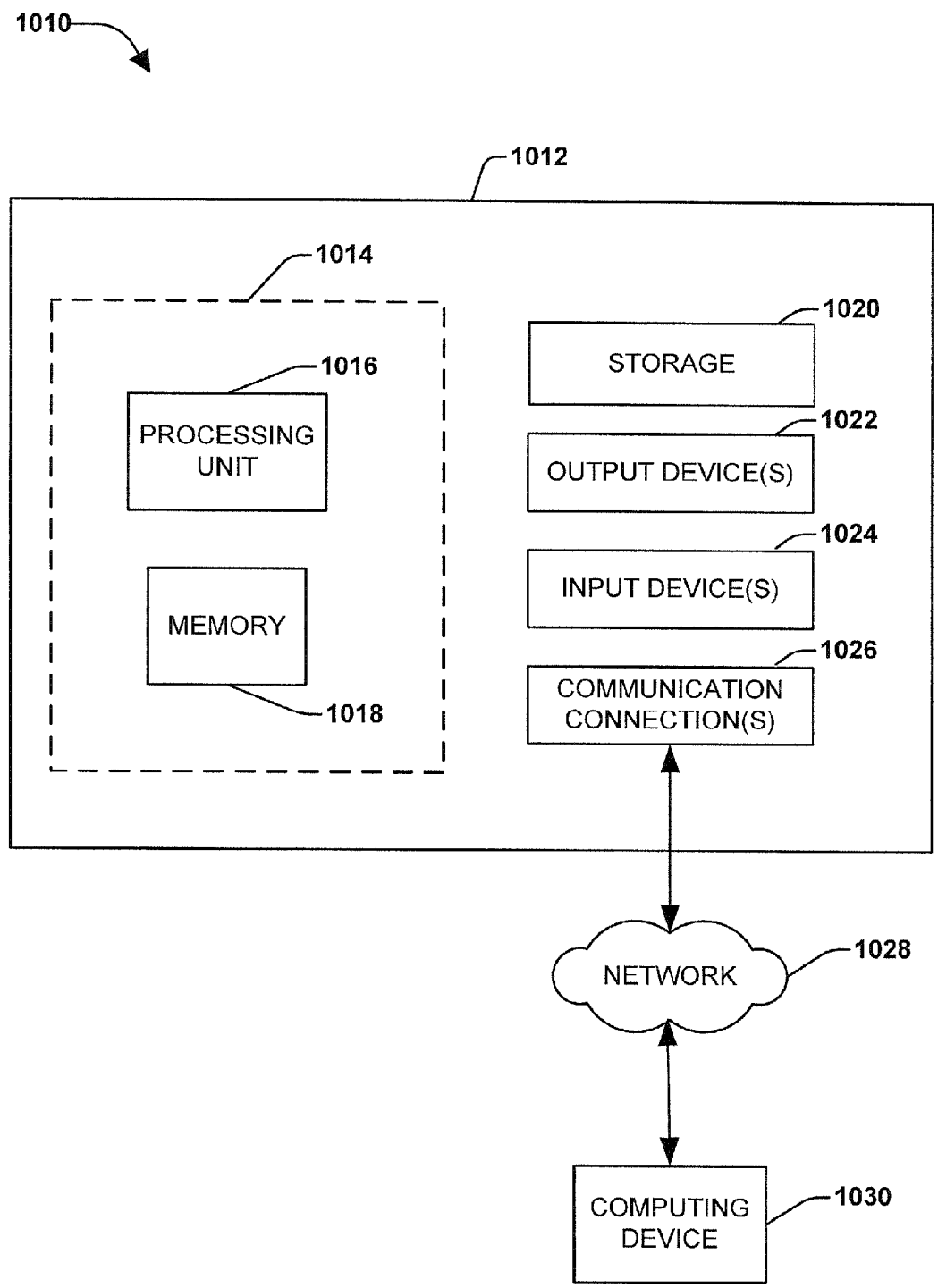
FIG. 10 is a block diagram representing an exemplary non-limiting computing system or operating environment in which one or more aspects of various non-limiting embodiments described herein can be implemented.

FIG. 10 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1018 and storage 1020 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer readable storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A data processing system comprising:
   one or more data stores (memory component), wherein at least one data store is configured to receive and store data obtained from a continuous data stream;
   at least one processor communicatively coupled to at least one of the one or more data stores;
   at least one channel component communicatively coupled to the one or more data stores and the at least one processor, the at least one channel component being configured for determining which channel of a plurality of channels to process time slots of sampled data from the continuous data stream stored in the one or more data stores, wherein the sampled data is time stamped in a discrete time domain;
   a common channel clock component and a real time clock, each communicatively coupled to the at least one of the plurality of channels, the common channel clock configured for time stamping time slots of the sampled data faster in the discrete time domain than the real time clock, and for processing the sampled data faster than the data is being received; and
   at least one compensation component communicatively coupled to the at least one channel of the plurality of channels, the at least one compensation component configured for compensating for gaps in the sampled data and after compensating, applying a corrected time stamp to the sampled data, wherein the compensation component comprises:
      a plurality of per channel time of day counter components that correspond to a plurality of channels, and configured for incrementing based on an increment value that is independent per channel among the plurality of channels respectively;
      a reference clock component that is configured for time stamping data being received in a non-discrete time domain; and
      a master time of day counter component configured for synchronizing the plurality of per channel time of data counter components, and is synchronized to the reference clock component.

2. The system of claim 1, wherein the compensation component further comprises a plurality of per channel error comparator components configured for determining a differential between a per channel time of day counter component of the plurality of per channel time of day counter components and the master time of day counter component, wherein the compensation component is further configured for compensating for the gaps based on a set of predetermined criteria comprising the differential being at or below a predetermined differential threshold that is independent per channel among the plurality of channels, and an amount of correction time that is determined from a correction field counter while compensating for the gaps.

3. The system of claim 1, wherein the compensation component further comprises a plurality of per channel gap counter components configured for determining a gap count of the gaps within the time slots being processed by the plurality of channels; and
   a plurality of per channel synchronization logic components configured for communicating with the plurality of per channel gap counter components and synchronizing the plurality of per channel time of day counter components with the master time of day counter component based on the gap count of the plurality of channels respectively satisfying a predetermined gap count threshold.

4. The system of claim 1, wherein the compensation component further comprises:
   a plurality of per channel incrementor components configured for incrementing the plurality of per channel time of day counter components with the increment value associated with the plurality of channels based on an amount of time that a respective channel of the plurality of channels accumulates the data for a predetermined word length, and the plurality of channels process the data at different speeds from one another.

5. The system of claim 4, wherein the plurality of per channel incrementor components are further configured for modifying the increment value of a channel based on a variance of differentials between a per channel time of day counter component of the plurality of per channel time of day counter components and the master time of day counter component at the gaps that are selected for synchronization.

6. The system of claim 5, wherein the compensation component further comprises:
   a plurality of per channel interpolator components configured for determining a time offset from a start of a packet within the data of the predetermined word length in a time slot and a location within the packet to prevent an introduction of a time error;
   wherein the compensation component is further configured for modifying the increment value of the plurality of per channel time of day counters based on the time offset.

7. A data processing method comprising:
   receiving a data stream in a non-discrete time domain based on a reference clock component;
   sampling the data stream in time slices in a discrete time domain that is faster than the reference clock component;
   compensating for a gap of data among the time slices based on a compensated time stamping;
   processing the data of the time slices with the compensated time stamping;
   incrementing a per channel time of day counter component corresponding to a channel of a plurality of channels based on an increment value associated with an amount of time for the channel to accumulate data of a predetermined word length and a time offset that is determined by a per channel interpolator component; and determining a differential between the per channel time of day counter component and a master time of day counter component that is synchronized to the reference clock component, wherein the compensating is based on at least one of determining whether a gap count satisfies a predetermined gap count threshold for a predetermined number of gaps and the differential being at or below a predetermined minimum differential threshold, or the differential being above a predetermined maximum threshold.

8. The method of claim 7, wherein the compensating for the gap of data comprises:
time stamping the time slices at different rates based on a channel processing speed of corresponding channels, and based on a predetermined number of data bits within the clap being below a predetermined data threshold.

9. The method of claim 7, wherein the compensating for the gap of data among the time slices comprises synchronizing the per channel time of day counter component with the master time of day counter component for the channel of the plurality of channels and an amount of correction time that is determined from a correction field counter from the synchronizing.

10. The method of claim 7, further comprising:
determining whether a gap count satisfies a predetermined gap count threshold for a predetermined number of gaps as part of predetermined criteria for the compensating.

11. The method of claim 10, further comprising:
determining whether the predetermined threshold is satisfied based on whether a difference between the non-discrete time domain and the discrete time domain satisfies a predetermined difference minimum threshold, in response to the gap count satisfying the predetermined number of gaps.

12. A computing system comprising:
a processor;
a plurality of processing channels;
a reference clock component configured by the processor for time stamping data of a continuous data stream, received by the computing system, in a non-discrete time;
a sampling component configured by the processor for sampling the continuous data stream in time slices based on a predetermined number of bits for a data word;
a common channel clock component configured by the processor for time stamping the time slices in a discrete time for the plurality of processing channels, the discrete time comprising a faster clock rate than the non-discrete time of the reference clock component; and
a channel component configured by the processor for determining the processing channel of the plurality of processing channels to process the time slices of data based on a compensated time stamp, the plurality of channels are configured for processing the time slices in parallel;
a per channel time of day counter component configured by the processor for tracking a time for a corresponding channel of the plurality of channels;
a master time of day counter component that is synchronized with the reference clock component and configured by the processor for synchronizing the per channel time of day counter component;
a per channel error comparator component configured by the processor for determining a difference in the per channel time of day counter and the master counter component;
a per channel gap counter component configured by the processor for determining a gap count of gaps of data within the time slices being processed by the plurality of channels; and
a per channel synchronization logic component configured by the processor for communicating with the per channel gap counter component and synchronizing the per channel time of day counter components with the master time of day counter component based on the gap count of the plurality of channels respectively satisfying a predetermined gap count threshold as a part of the set of predetermined criteria.

13. The computing system of claim 12, comprising:
a compensation component configured by the processor for compensating for a gap of data that results from a difference in the non-discrete time and the discrete time, based on a differential of the time gap being at or below a predetermined threshold.

14. The computing system of claim 13, wherein the compensation component is further configured by the processor for compensating for the time gap based on a set of predetermined criteria comprising at least one of an amount of data available for processing during the time slot of the time gap, a duration of gaps of data of a channel, or a number of counted gaps for a channel of the plurality of channels satisfying a predetermined threshold.

15. The computing system of claim 12, wherein the continuous data stream comprises a plurality of data streams having different data protocols with different protocol parameters for processing via the plurality of channels.

16. The computing system of claim 12, comprising:
a per channel incrementor component configured by the processor for incrementing the per channel time of day counter component with an increment value based on an amount of time that the corresponding channel of the plurality of channels accumulates the time slices of data for a predetermined word length of the data word, and the plurality of channels process the time slices of data at different speeds from one another; and
a per channel interpolator component configured by the processor for determining a time offset from a start of a packet within the data of the predetermined word length in a time slice and a location within the packet to prevent an introduction of a time error from occurring during a synchronization event.

\* \* \* \* \*